Figure 1:
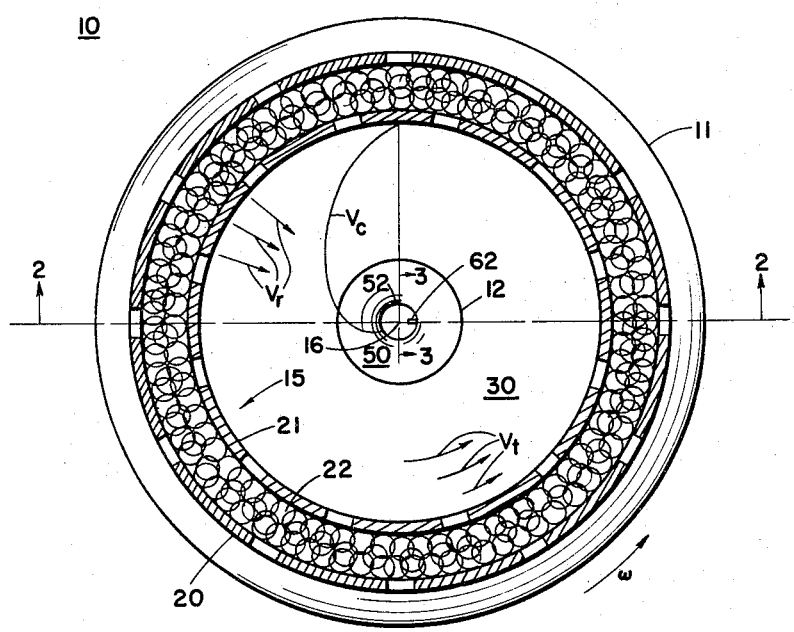

Sept. 12, 1967 R. J. REILLY 3,340,737
FLUID VORTEX APPARATUS
Filed Dec. 4, 1961 2 Sheets-Sheet 1

INVENTOR.
RICHARD J. REILLY
BY Roger W. Jensen
ATTORNEY.

Sept. 12, 1967  R. J. REILLY  3,340,737

FLUID VORTEX APPARATUS

Filed Dec. 4, 1961  2 Sheets-Sheet 2

*INVENTOR.*
RICHARD J. REILLY

BY Roger W. Jensen

ATTORNEY.

United States Patent Office 3,340,737
Patented Sept. 12, 1967

3,340,737
FLUID VORTEX APPARATUS
Richard J. Reilly, St. Paul, Minn., assignor to Honeywell Inc., a corporation of Delaware
Filed Dec. 4, 1961, Ser. No. 156,613
13 Claims. (Cl. 73—505)

This invention relates to fluid flow sensors and more particularly to pressure and flow responsive fluid flow sensors.

This invention has special application to angular velocity or rate sensing instruments commonly referred to by those skilled in the art as fluid vortex rate sensors, although the invention is by no means limited to such application. The applicant's invention may be utilized in any control apparatus wherein it is desirable to sense the nature of the fluid flow. The applicant's invention produces an output signal which is indicative of the nature of the fluid flow and which, as will be well understood by those skilled in the art, may be utilized to control various apparatus requiring such information. An example of this type of control apparatus is a fluid vortex amplifier. A fluid vortex amplifier is a device which functions to provide amplification of a fluid signal by means of vortical fluid flow. The applicant's invention will be described as utilized in a specific embodiment of a fluid vortex amplifier referred to as a vortex rate sensor. A vortex rate sensor is a device utilized to sense rate of turn (angular velocity) about an axis of a body upon which it is mounted. The measurement of angular velocity (rate) is utilized in aircraft rate of climb meters and turn and bank indicators. Other applications for rate sensors are automatic flight control systems (autopilots) and direction seeking instruments. The vortex rate sensor generally comprises a device which provides a fluid flow field which in the absence of an input rate closely approximates the classical two-dimensional pure sink flow. The fluid flow in such a pure sink flow has only radial velocity. When the fluid flow field of the vortex rate sensor is subjected to an angular velocity relative to inertial space, a pure vortex flow having only tangential (or rotational) velocity is superimposed upon the pure sink flow. The superimposition of the pure sink flow and the pure vortex flow results in a combined vortex-sink flow in which the fluid streamline pattern is a logarithmic spiral, if the viscous effects in the flowing fluid are neglected.

To satisfy the equation of continuity, the radial velocity of a pure sink flow will increase due to the narrowing of the streamlines as the fluid approaches the sink (also referred to as a core, bore, passage, or exit tube) of the vortex rate sensor. Due to the principle of the conservation of angular momentum, the tangential or rotational velocity of the pure vortex flow will also increase as the flow approaches the sink. It follows that the velocity of the fluid in the combined vortex-sink flow increases as the fluid approaches the sink. Thus it is evident that a vortex rate sensor possesses the characteristic of amplification of the parameter to be sensed (angular velocity) within the sensing element itself. By varying the geometry of the vortex rate sensor various amplification levels may be obtained.

Since it is the angular velocity input which is desired to be measured and it is the angular velocity input which superimposes a pure vortex flow upon a pure sink flow, a method must be utilized to sense the effect of the angular velocity input upon the fluid flow of the vortex gyro.

Heretofore, the principle of the vortex rate sensor has been known to those skilled in the art and because of its relative structural simplicity it is not difficult to construct a vortex rate sensor capable of providing a suitable pure sink flow field. However, calculation and experimentation by those skilled in the art, establishes that the prime problem area of the vortex rate sensor is obtaining a satisfactory means of sensing the effect of the angular velocity input upon the fluid flow. The prior art fluid flow sensors do not provide an output of the desired level of accuracy, sensitivity, and reliability, while achieving an acceptable level of aerodynamic or hydrodynamic noise.

The applicant has provided a unique means for sensing the effect of an angular velocity of the vortex rate sensor upon the fluid flow of the vortex rate sensor which provides an output of increased sensitivity, accuracy, and reliability which heretofore was unobtainable. The applicant's unique sensing means has broad application as a fluid flow sensor. The applicant's unique fluid flow sensing means senses a pressure differential across a blade element positioned within a fluid flow to provide a signal indicative of the flow pattern of the fluid.

It is therefore an object of this invention to provide an improved fluid apparatus.

Figure 2:
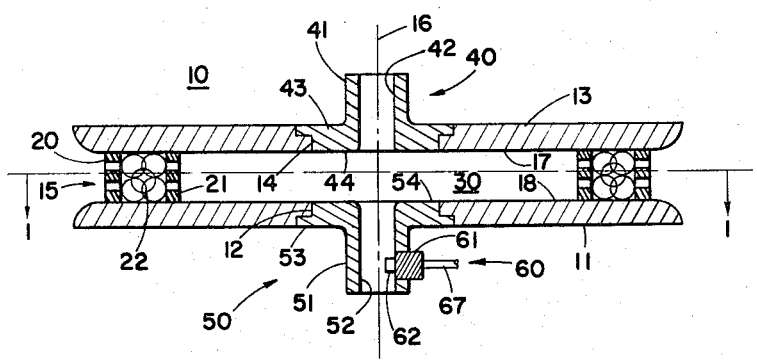
Figure 3:
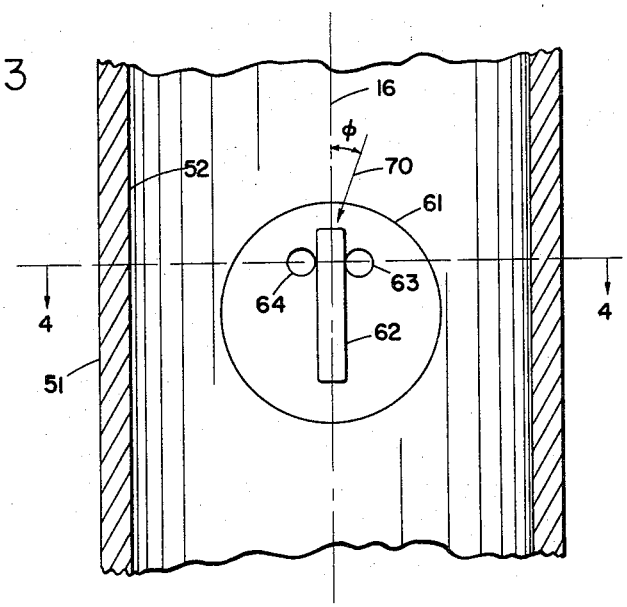
Figure 4:
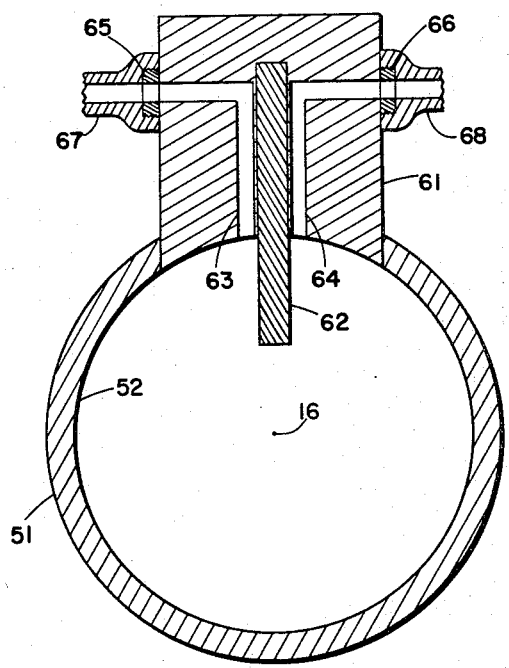

This and other objects of the invention will become apparent from a study of the accompanying specification and claims in conjunction with the drawings in which:

FIGURE 1 is a schematic cross sectional view of a vortex rate sensor taken along lines 1—1 of FIGURE 2; and FIGURE 2 is a cross sectional view of a vortex rate sensor taken along lines 2—2 of FIGURE 1; and FIGURE 3 is an enlarged cross sectional view of a fluid flow sensor taken along lines 3—3 of FIGURE 1; and FIGURE 4 is an enlarged cross sectional view of the fluid flow sensor taken along section lines 4—4 of FIGURE 3.

Referring now to FIGURE 1, reference numeral 10 generally depicts a vortex rate sensor. A generally cylindrical plate element 11 is provided having a plane surface 18 thereon. Plate element 11 has a central aperture 12 therein having a circular cross section. Reference to FIGURE 2 indicates a second generally cylindrical plate element identified by reference numeral 13. Plate element 13 has a plane surface 17 thereon and a central aperture 14 therein having a generally circular cross section.

Reference numeral 15 generally depicts a porous ring shaped or annular coupling means. The term porous as utilized in this specification means permeable to fluids. Coupling means 15 comprises a generally cylindrical outer screen member 20 and a generally cylindrical inner screen member 21. It will be noted that inner screen element 21 has a slightly smaller diameter than outer screen element 20. Positioned between inner screen 21 and outer screen 20 are a plurality of glass balls 22 which are very small in diameter, on the order of .015 inch. It is clear that coupling means 15 is porous in nature and allows fluid to pass therethrough with a minimum of restriction. It should be pointed out, that other suitable porous coupling means may be utilized, for example sintered metals, or ceramics.

The cylindrical coupling means 15 is positioned between the plate elements 11 and 13 thereby maintaining plane surfaces 17 and 18 in a spaced parallel relationship. The axis of the cylindrical coupling means 15 is identified by reference numeral 16. Axis 16 is substantially perpendicular to plane surfaces 17 and 18.

Plate elements 11 and 13 in conjunction with coupling means 15 collectively define a vortex chamber 30. The outer periphery of the chamber 30 is defined by the inner screen element 21. The ends of chamber 30 are defined by the plane surface 17 of plate element 13 and the plane surface 18 of plate element 11.

A first exit member 40 is provided. Exit member 40 comprises a tube or fluid conduit 41 having a generally cylindrical bore or passage 42 therethrough. Although a cylindrical passage is shown, passages having other configurations are within the scope of the applicant's invention. Conduit or tube 41 has an external flange or passage portion 43 on one end thereof. The flange portion 43 is positioned within the aperture 14 of plate element 13 such that the bore 42 of exit member 40 is positioned coaxial with axis 16. An end surface 44 of exit member 40 is positioned so as to lie in the same plane as the plane surface 17 of plate element 13. Exit member 40 is rigidly attached to plate 13 by suitable means (not shown) such as adhesives or screws.

A second exit member 50 is also provided. Exit member 50 comprises a tube or fluid conduit 51 having a generally cylindrical bore or passage 52 therethrough. Although a cylindrical passage is shown, passages having other configurations are within the scope of the applicant's invention. Conduit or tube 51 has a flange portion 53 on one end thereof. The flange portion 53 is positioned within the aperture 12 of plate element 11 such that the bore 52 of exit member 50 is positioned coaxial with axis 16. An end surface 54 of exit member 50 is positioned so as to lie in the same plane as the plane surface 18 of plate member 11. Exit member 50 is then rigidly attached to plate member 11 by suitable means (not shown) such as adhesives or screws.

A unique fluid flow sensing means 60 is also provided and is illustrated in FIGURE 2 as positioned within exit member 50. Fluid flow sensing means 60 is more clearly illustrated in FIGURES 3 and 4. A blade element having a rectangular cross section is positioned within the bore 52 of exit member 50. The applicant does not wish to be limited to a blade element having a rectangular cross section as illustrated; the blade may take other forms. In addition, the length of the blade element need not be limited to that illustrated. The blade element may extend completely across the bore of the exit member or across any portion thereof. It will be noted that blade element 62 is positioned within bore 52 substantially parallel to axis 16 of coupling means 15. Two pressure ports 63 and 64 are positioned contiguous blade element 62, one pressure port being located on either side of blade element 62. The pressure ports are positioned generally toward the end of blade 62 nearest chamber 30. Pressure ports 63 and 64 are in communication with bore 52 of exit member 50 at one end and are connected to a differential pressure sensor (not shown) at the opposite end.

In practice, blade element 62 is attached to a mounting means 61 to facilitate positioning with bore 52. Pressure ports 63 and 64 are also contained within the mounting means 61. However, other means may be utilized to locate blade 62 and pressure ports 63 and 64 relative to bore 52; the mounting means 61 constitutes no part of the present invention.

With reference to FIGURE 4, blade element 62 is positioned within a suitable recess in mounting means 61. Pressure ports 63 and 64 are located on either side of blade element 62 within mounting means 61. Pressure ports 63 and 64 are in communication with bore 52 at one end and the opposite ends terminate at output fixtures 65 and 66 respectively. Suitable pressure lines 67 and 68 are connected to the output fixtures 65 and 66 respectively to connect pressure ports 63 and 64 to a suitable differential pressure sensor (not shown).

OPERATION

In operation, a pressure differential exists between coupling means 15 and bores 42 and 52 of exit members 40 and 50. Consequently, a fluid flows from coupling means 15, through chamber 30, and out bores 42 and 52. In the absence of any input (angular velocity about axis 16 of the vortex rate sensor), the fluid flow comprises only radial velocity as illustrated by vectors $V_r$ in FIGURE 1 and is described by those skilled in the art as a pure sink flow. It can be shown, that the radial velocity of the fluid at any particular point in the vortex chamber 30 is described by the formula:

$$V_r = \left(\frac{m}{2\pi\rho}\right)\frac{1}{r}$$

where $m$ is the mass flow per unit height; $\rho$ is the fluid density and $r$ is the radius from the axis 16 to the point of interest. It is clear from the formula that the radial velocity of the fluid increases as it approaches the sink or bore 52.

When the vortex rate sensor is subjected to an input rate, that is, an angular velocity $\omega$ about the axis 16, the fluid within the coupling means 15 is given a tangential or rotational velocity as illustrated by vectors $V_t$ in FIGURE 1. The tangential or rotation velocity imparted to the fluid is referred to by those skilled in the art as a pure vortex flow. The tangential or rotational velocity of the fluid at any point is as given by the formula:

$$V_t = \frac{\omega r_a}{r}$$

where $\omega$ is the input rate or angular velocity, $r_a$ is the radius of chamber 30 (from axis 16 to the coupling means 15), and $r$ is the radius to the point of interest. It is clear from the above formula that the tangential or rotational velocity increases as the fluid approaches the sink or bore 52. This is explained as an application of the principle of conservation of momentum.

The superimposition of the pure vortex flow upon the pure sink flow results in a combined vortex-sink flow. The streamline pattern of the fluid, neglecting viscous effects, in the combined vortex-sink flow is a logarithmic spiral as identified in FIGURE 1 by reference symbol $V_c$. The fluid in chamber 30 flows parallel to the plane surfaces 17 and 18.

As the fluid, flowing in the logarithmic spiral flow pattern, reaches the sink, it flows out through bores 42 and 52. The bores 42 and 52 are coaxial with axis 16 and thus perpendicular to the plane of the fluid flow outside of the sink. Thus, as the fluid flows out of the vortex chamber 30 through bores 42 and 52, it is displaced 90° from its original plane of flow. This results in a fluid flow pattern in the bores 42 and 52 in the form of a helix. That is to say, there is a component of the fluid flow having a longitudinal velocity parallel to axis 16 and a component of the fluid flow having a rotational velocity perpendicular to axis 16. Consequently, the fluid flows through the bores 42 and 52 in a helix pattern; analogous to the flow pattern behind a propellor.

It should be noted that the component of the fluid flow within bore 52 perpendicular to axis 16 is indicative of the input rate $\omega$. The tangential or rotational velocity $V_t$ imparted to the fluid within coupling means 15 appears in bore 52 as the component of fluid flow having a velocity perpendicular to axis 16. As pointed out earlier, the magnitude of the tangential or rotational velocity has been amplified within the vortex rate sensor. Consequently, it is possible to sense the input rate $\omega$, by determining the magnitude of the fluid flow perpendicular to axis 16.

The applicant has provided a unique fluid flow sensor which may be utilized in a vortex rate sensor to measure the component of the fluid flow having a velocity perpendicular to axis 16 within bore 52, induced by input rate ω. The fluid flow sensor disclosed by the applicant may be utilized in numerous other instruments as hereinbefore indicated, however its operation will be described with reference to the vortex rate sensor.

At the null condition (no input rate), the fluid flow in the vortex rate sensor is a pure sink flow, that is, there is only radial fluid velocity in the vortex chamber 30. In the bore 52 or sink outlet the fluid flow is longitudinal only, that is, parallel to the axis 16. When the fluid flow is parallel to the axis 16 the pressure on either side of blade element 62 is equal. Therefore, pressure port 63 and pressure port 64 both sense substantially equal pressures. Since the pressure ports 63 and 64 are connected to a differential pressure sensor it is clear that there will be no output signal from the fluid flow sensing means 60 when the flow is parallel to the axis 16.

However, when the vortex rate sensor is subjected to a rate input, the fluid flow through the bore 52 is in the form of a helix. As the flow through the bore 52 follows a helical pattern, the fluid impinges on the blade element 62 as illustrated by arrow 70 in FIGURE 3, at a particular angle $\phi$ defined as the helix angle. The helix angle $\phi$ at which the fluid impinges blade 62 may be determined by the formula:

$$\text{tangent } \phi = \frac{\omega r_1 2\pi \rho r_a^2}{mh}$$

where $m$ equals the mass flow per unit heighth, $\rho$ equals the mass density of the fluid, $h$ equals the distance between plates 11 and 13, $\omega$ equals the input rate, $r_a$ equals the radius of coupling means 15, and $r_1$ equals the radius of bore 52. Thus it is seen that the helix angle $\phi$ is a function of the input rate $\omega$.

The pressure of the fluid flowing upstream towards chamber 30) from blade element 62 is defined as the free stream pressure. As the fluid flow impinges the blade element 62 at a particular helix angle $\phi$, a differential pressure exists across the blade element 62. More specifically, fluid flow impinging the blade element 62 in a direction indicated by arrow 70 in FIGURE 3, results in a positive pressure (relative to the free stream pressure) at pressure port 63 and a negative pressure (relative to the free stream pressure) at pressure port 64. The magnitude of the pressure differential existing between pressure port 63 and 64 is a function of the helix angle $\phi$ at which the fluid impinges the blade element 62. The helix angle $\phi$ at which the fluid flow impinges the blade element 62 is a function of the input rate $\omega$ to the vortex rate sensor and of the strength of the sink flow. Consequently, the pressure differential between pressure ports 63 and 64 is indicative of the input rate to the vortex rate sensor when the sink flow is held at constant strength.

Thus the applicant has provided a unique fluid flow sensor in which the pressure differential existing across a blade element is indicative of a component of fluid flow perpendicular to the blade element. As applied to a vortex rate sensor, the fluid flow sensor produces a signal indicative of the input rate to the vortex rate sensor.

While I have shown and described a specific embodiment of my invention, further modifications and improvements will occur to those skilled in the art. I desire it to be understood, therefore, that this invention is not limited to the particular form shown and I intended in the appended claims to cover all modifications which do not depart from the spirit and the scope of this invention.

What I claim is:

1. In an apparatus of the class described: a member having a passage therein, said apparatus being adapted to be connected to a fluid source whereby a fluid flows from said fluid source through said passage substantially along the axis of said passage; means for introducing helical fluid flow through said passage; a blade element, said blade element being positioned within said passage substantially parallel to the axis of said passage; and a plurality of pressure ports within said member in communication with said passage, at least one of said pressure ports being positioned on either side of said blade element, a difference in pressure between a pressure port on one side of said blade element and a pressure port on the opposite side of said blade element being indicative of helical fluid flow through said passage.

2. In a control apparatus, a first element having a first plane surface thereon and having a passage therethrough, the axis of said passage being substantially perpendicular to said first plane surface; a second element having a second plane surface thereon; porous coupling means positioned between said first plane surface and said second plane surface thereby maintaining said first plane surface and said second plane surface in a spaced parallel relationship; a blade element positioned within said passage substantially parallel to said axis, said blade element being mounted to remain substantially stationary with respect to said first element; and means associated with said blade element and operable to produce a signal indicative of fluid flow perpendicular to said axis of said passage.

3. In an apparatus of the class described: a member having a passage therein through which a fluid is adapted to flow substantially along the axis of said passage; means for introducing a component of fluid flow perpendicular to the axis of said passage; a blade element, said blade element being positioned within said passage substantially parallel to the axis of said passage; and means operable to produce a fluid signal indicative of the pressure differential across said blade element as a result of fluid flow perpendicular to the axis of said passage.

4. In an apparatus of the class described: a first plate element having an aperture therethrough; a second plate element having an aperture therethrough; a cylindrical porous coupling means positioned between said first and said second plates thereby maintaining said first and said second plates in a substantially parallel spaced relationship such that the axis of said coupling means is substantially perpendicular to said plates; a first exit member having a bore therethrough positioned within said aperture of said first plate; a second exit member having a bore therethrough positioned within said aperture of said second plate, said bore of said first exit member and said bore of said second exit member being positioned coaxial with said axis of said coupling means, the apparatus being adapted to be connected to a fluid source whereby a fluid flows from said fluid source through said coupling means, between said first element and said second element, and exhausts through said bore of said first element and said bore of said second element; a blade element having a rectangular cross section, said blade element being positioned within said bore of said first exit member substantially parallel to said axis of said coupling means; and two pressure ports within said first exit member in communication with said bore of said first exit member, said pressure ports being positioned on opposite sides of said blade element.

5. In an apparatus of the class described: a first element having an aperture therethrough; a second element having an aperture therethrough; a cylindrical porous coupling means positioned between said first and said second elements thereby maintaining said first and said second elements in a substantially parallel spaced relationship such that the axis of said coupling means is substantially perpendicular to said elements; a first exit member having a bore therethrough positioned within said aperture of said first element; a second exit member having a bore therethrough positioned within said aperture of said second element, said bore of said first exit member and said bore of said second exit member being positioned coaxial with said axis of said coupling means, the apparatus being adapted to be connected to a fluid source whereby a fluid flows from said fluid source through said coupling means, between said first element and said second element, and exhausts through said bore of said first element and said bore of said second element; a blade member, said blade member being positioned within said bore of said first exit member substantially parallel to said axis of said coupling means; and a plurality of pressure ports within said first exit member in communication with said bore of said first exit member, at least one of said pressure ports being positioned on each side of said blade member.

6. In an apparatus of the class described: a first element having a plane surface thereon, said first element having an opening therethrough; a second element having a plane surface thereon; a cylindrical porous coupling means positioned between said plane surface of said first element and said plane surface of said second element thereby maintaining said plane surface of said first element and said plane surface of said first element in a substantially parallel spaced relationship; an exit tube positioned within said opening in said first element coaxial with the axis of said coupling means, the apparatus being adapted to be connected to a fluid source whereby a fluid flows from said fluid source through said coupling means, between said first element and said second element, and exhausts through said exit tube; a blade element positioned within the passage of said exit tube substantially parallel to said axis; and a pressure port on each side of the blade element, a difference in pressure between said pressure ports being indicative of a component of fluid flow perpendicular to said axis.

7. In an apparatus of the class described: a first element having a first plane surface thereon and having an opening therethrough; a second element having a second plane surface thereon; annular porous coupling means positioned between said first plane surface and said second plane surface thereby forming a chamber symmetrical about an axis, said axis of said chamber being substantially perpendicular to said first plane surface and said second plane surface; an exit tube positioned within said opening in said first element substantially coaxial with said axis, the apparatus being adapted to be connected to a fluid source whereby a fluid flows from said fluid source through said coupling means, through said chamber, and exhausts through said exit tube; a blade element positioned within the passage of said exit tube substantially parallel to said axis; and a plurality of pressure ports located within said exit tube, at least one of said pressure ports being located on each side to said blade element, a difference in pressure between said pressure ports being indicative of a component of fluid flow perpendicular to said axis.

8. In an apparatus of the class described: a first element having an aperture therethrough; a second element; cylindrical porous coupling means positioned between said first and said second element thereby maintaining said first and said second elements in a substantially parallel spaced relationship such that the axis of said coupling means is substantially perpendicular to said elements; an exit member having a bore therethrough positioned within said aperture of said element, said bore of said exit member being positioned coaxial with said axis of said coupling means, the apparatus being adapted to be connected to a fluid source whereby a fluid flows through said coupling means, between said first element and said second element, and exhausts through said bore of said exit member; a blade member, said blade member being positioned within said bore of said exit member substantially parallel with said axis of said coupling means; and means operable to produce a fluid signal indicative of the pressure differential across said blade member as a result of a component of fluid flow perpendicular to said axis of said coupling means.

9. In an apparatus of the class described: a first element having a first plane surface thereon and having a passage therethrough, the axis of said passage being substantially perpendicular to said first plane surface; a second element having a second plane surface thereon; porous coupling means positioned between said first plane surface and said second plane surface thereby forming a cylindrical chamber, the axis of said chamber being substantially perpendicular to said first plane surface and said second plane surface, the apparatus being adapted to be connected to a fluid source whereby a fluid flows through said coupling means, through said chamber, and exhausts through said passage; a blade element positioned within said passage of said first element substantially parallel to said axis of said passage; and means operable to produce a fluid signal indicative of the pressure differential across said blade element as a result of a component of fluid flow perpendicular to said axis of said passage.

10. In an apparatus of the class described: means forming a chamber symmetrical about an axis including porous coupling means; an outlet passage in fluid communication with said chamber, said passage being substantially coaxial with said chamber; means for providing a flow of fluid through said coupling means, through said chamber, and exhausting through said passage; a blade element positioned within said passage substantially parallel to said axis; and a plurality of pressure ports located within said exit tube, at least one of said pressure ports being located on each side of said blade element.

11. In a fluid amplifier: means forming a chamber symmetrical about an axis including porous coupling means; exit passage means in fluid communication with said chamber, said passage coaxial with said chamber; said apparatus being adapted to be connected to a fluid source whereby a fluid flows from said fluid source through said chamber and out said exit passage means; a blade element positioned within said passage substantially parallel to said axis, said blade element being mounted to remain substantially stationary with respect to said exit passage means; and means operable to produce a signal indicative of the pressure differential across said blade element as a result of a component of fluid flow perpendicular to said axis.

12. In an apparatus of the class described: a member having a passage therein through which a fluid may flow substantially along the axis of said passage; means for introducing a component of fluid flow perpendicular to the axis of said passage; a blade element; means for mounting said blade element within said passage substantially parallel to the axis of said passage; and a plurality of pressure ports within said member in communication with said passage, at least one of said pressure ports being positioned on either side of said blade element.

13. In an apparatus of the class described: a member having a passage therein; means for providing a flow of fluid substantially along the axis of said passage; means for introducing a component of fluid flow perpendicular to the axis of said passage; a blade element having a rectangular cross section, said blade element being positioned within said passage substantially parallel to the axis of said passage; a first pressure port within said member in communication with said passage; and a second pressure port within said member in communication with said passage, said blade element being positioned between said first pressure port and said second pressure port, a difference in pressure between said first pressure port and said second pressure port being indicative of the component of fluid flow perpendicular to the axis of said passage, the magnitude of said difference in pressure being indicative of the magnitude of the component of fluid flow perpendicular to the axis of said passage.

References Cited

UNITED STATES PATENTS

| | | | |
|---|---|---|---|
| 2,106,574 | 1/1938 | Moore | 73—228 |
| 2,344,946 | 3/1944 | Landon | 158—42.2 |
| 2,352,607 | 7/1944 | Alperin | 73—212 |

(Other references on following page)

UNITED STATES PATENTS

| | | | |
|---|---|---|---|
| 2,753,686 | 7/1956 | Billman | 60—39.28 |
| 2,811,855 | 11/1957 | Kotas | 73—228 |
| 2,969,939 | 1/1961 | Sulkin et al. | 60—35.6 |
| 3,276,259 | 10/1966 | Bowles et al. | 73—169 X |

FOREIGN PATENTS 971,173  6/1950  France.

OTHER REFERENCES

Pengelley: Flow in a Viscous Vortex, Journal of Applied Physics, January 1957, vol. 28, No. 1, pp. 86–92, copy in Scientific Library.

JAMES J. GILL, *Acting Primary Examiner*.

ROBERT L. EVANS, SAMUEL FEINBERG, RICHARD C. QUEISSER, *Examiners*.

S. CLEMENT SWISHER, L. L. HALLACHER, R. F. STAHL, EDWARD D. GILHOOLY,
*Assistant Examiners*.